United States Patent [19]
Syrop et al.

[11] 3,910,879

[45] Oct. 7, 1975

[54] THERMAL STABILIZATION OF HALOGENATED POLYOLS

[75] Inventors: Allan H. Syrop, Hamden; Pedro T. Tejera, New Haven, both of Conn.

[73] Assignee: Olin Corporation, New Haven, Conn.

[22] Filed: Feb. 8, 1974

[21] Appl. No.: 440,896

[52] U.S. Cl.... 260/209 R; 260/2.5 AJ; 260/2.5 AS; 260/2.5 AL; 260/2.5 BB; 260/33.6 UB; 260/45.7 R; 260/77.5 SS; 260/210 R; 260/611.5; 260/632.5

[51] Int. Cl.² .................. C07H 15/08; C07C 41/00

[58] Field of Search .......... 260/209 R, 611.5, 632.5, 260/210 R

[56] References Cited

UNITED STATES PATENTS

| | | | |
|---|---|---|---|
| 3,350,389 | 10/1967 | Patton et al. | 260/209 R |
| 3,385,900 | 5/1968 | Carpenter et al. | 260/209 R |
| 3,402,169 | 9/1968 | Jackson et al. | 260/209 R |
| 3,660,502 | 5/1972 | Case | 260/209 R |
| 3,726,855 | 4/1973 | Lapkin | 260/209 R |

*Primary Examiner*—Johnnie R. Brown
*Attorney, Agent, or Firm*—F. A. Iskander; T. P. O'Day

[57] ABSTRACT

Turpentine is utilized to stabilize halogen-containing polyols against thermal degradation.

14 Claims, No Drawings

THERMAL STABILIZATION OF HALOGENATED POLYOLS

This application relates to a process for stabilizing halogenated polyols and to stabilized compositions produced thereby.

The utility of polyols, including polyester polyols and polyether polyols, in the production of cellular and non-cellular polyurethanes is well known in the art. It is also known that polyurethanes derived from halogenated polyols exhibit varying degrees of resistance to burning; and in view of the increasing demand for flame retardant polyurethane foam, a variety of halogenated polyols have been developed for use by the polyurethanes industry. Representative of these are polyether polyols which contain two or more halogens substituted on an aliphatic carbon atom within the polyol molecule. See for example U.S. Pat. Nos. 3,402,169 and No. 3,726,855.

However, the utility of halogenated polyols is circumscribed by the fact that they degrade in quality on being exposed to moderately elevated temperatures such as may be encountered in processing or during storage. Common symptoms of the degradation usually include discoloration and increased acidity and water content, all of which are detrimental to the utility of the polyol in making polyurethane foam.

Now it has been found, according to the invention, that halogenated polyols can be stabilized against thermal degradation by mixing therewith a stabilizing amount of turpentine. The inclusion of this relatively inexpensive and readily available material in halogenated polyols has been found to markedly improve their thermal stability thereby obviating the limitations that heretofore existed in connection with the handling, storage and use of these polyols.

As used in the specification and claims herein, the term "halogenated polyol" is intended to encompass any polyol containing at least one halogen atom substituted on an aliphatic carbon atom in the polyol molecule, the halogen being chlorine, bromine or a mixture thereof. These polyols usually have 2–8 hydroxyl groups and include polyether polyols, polyester polyols and mixtures thereof. However, the polyether polyols, including mixtures of halogenated and halogen-free polyether polyols, are preferred.

The polyether polyols include the halogenated oxyalkylated polyols. These usually have a molecular weight within the range of about 200–10,000, and preferably about 250–8,000. They may be prepared by a method generally well known in the art wherein a polyhydroxy compound, including mixtures thereof, is condensed, in the presence of an acid or basic catalyst, with a halogenated alkylene oxide or a mixture of halogenated and halogen-free alkylene oxides using random or step-wise addition. U.S. Pat. No. 3,402,169, issued Sept. 17, 1969, to D. R. Jackson, provides a detailed description of this method. The entire disclosure of this Jackson patent is incorporated herein by reference.

In preparing the halogenated polyether polyols, any polyhydroxy compound, including mixtures of such compounds and alkylene oxide condensates thereof, may be employed which contains 2–8 hydroxyl groups and is suitable for reaction with an alkylene oxide to form a polyether. Thus a wide range of polyhydroxy compounds is contemplated for use in preparing the polyether polyols which are stabilized according to the invention. For illustration, the polyhydroxy compounds include ethylene glycol, propylene glycol, isobutylene glycol, 2,3-butanediol, 1,4-dihydroxy-2-butane, 1,4-dihydroxycyclohexane, 2-butyne-1,4-diol, 1,12-dihydroxyoctadecane, glycerin, trimethylolpropane, sorbitol, mannitol, inositol, erythritol, pentaerythritol, sucrose, dextrose (hydrous or anhydrous), methyl glucoside, 1,4-dimethylolbenzene, glycerin monochlorohydrin, diglycerol, methyl ether of glycerin, mixtures thereof, and condensates thereof with alkylene oxide, e.g., ethylene oxide, propylene oxide, butylene oxide, and epichlorohydrin.

The polyhydroxy compounds also include, as a preferred group, the carbohydrate-based materials, particularly dextrose- and sucrose-based materials. As used in the specification and claims herein, the term "dextrose-based material", means one of the following: a mixture of dextrose and water, an oxyalkylated mixture of dextrose and water, a mixture of dextrose and an aliphatic polyhydric alcohol, an oxyalkylated mixture of dextrose and an aliphatic polyhydric alcohol, a mixture of dextrose, water, and an aliphatic polyhydric alcohol, or an oxyalkylated mixture of dextrose, water, and an aliphatic polyhydric alcohol; and by the same token, the term "sucrose-based material" means one of the following: a mixture of sucrose and water, an oxyalkylated mixture of sucrose and water, a mixture of sucrose and an aliphatic polyhydric alcohol, an oxyalkylated mixture of sucrose and an aliphatic polyhydric alcohol, a mixture of sucrose, water, and an aliphatic polyhydric alcohol, or an oxyalkylated mixture of sucrose, water, and an aliphatic polyhydric alcohol. Illustrative aliphatic polyhydric alcohols which may be used in preparing the dextrose- and sucrose-based materials include, for example, ethylene glycol, propylene glycol, glycerol, trimethylolpropane, mixtures thereof and the like. A detailed description of the dextrose- and sucrose-based materials and their preparation is provided in U.S. Pat. No. 3,741,921, issued June 26, 1973, to M. Lapkin, the entire disclosure of which is incorporated by reference herein. The dextrose-based materials are especially preferred for use in preparing polyether polyols that are stabilized according to the invention.

In preparing the halogenated polyether polyol, any alkylene oxide, or mixture thereof, may be used which has one or more halogen substituents, the halogen being chlorine, bromine or a mixture thereof, and which alkylene oxide is capable of reacting with a polyhydroxyl compound to form a polyether polyol. If desired, a mixture of a halogen-substituted and a halogen-free alkylene oxide may be used. These alkylene oxides usually contain an epoxide ring and have from 2–4 carbon atoms. Preferred among them are the vicinal alkylene oxides, e.g., those having a 1,2-epoxide ring, particularly those having 3–4 carbon atoms. It is also preferred that the halogen-substituted alkylene oxide contain at least 2 halogens. Representatives of these include 3,3-dibromo-1,2-epoxypropane, 3,3,3-trichloro-1,2-epoxypropane, 4,4,4,3,3-pentachloro-1,2-epoxybutane, 1,1,1,4,4-pentachloro-2,3-epoxybutane, and mixtures thereof. The most preferred such alkylene oxides are those in which all of the halogens are chlorine, such as 4,4,4-trichloro-1,2-epoxybutane.

Any suitable catalyst may be employed to promote the reaction of the polyhydroxy compound with the halogenated alkylene oxide. This includes basic catalysts, such as sodium hydroxide and potassium hydroxide and acid catalysts, such as boron trifluoride and its etherates. The latter catalyst is preferably employed in preparing polyether polyols based on carbohydrate-based polyhydroxy compounds.

As is well known in the art, the relative proportion of alkylene oxide, or mixture of alkylene oxides, which is used depends on the hydroxyl number which is desired in the polyether polyol product. In accordance with the preferred embodiments of the invention, a sufficient proportion of alkylene oxide is employed to yield a halogenated polyether polyol having a hydroxyl number of about 100–800, more preferably about 200–700, and still more preferably about 250–650. It is also preferred that the halogen content in the polyether polyol be no less than about 15%, more preferably about 20–80%, and still more preferably about 25–60% by weight.

The proportion of turpentine which is used in practicing the invention is not limited to any particular amount or range, so long as its inclusion with the halogenated polyol improves its thermal stability without otherwise altering its chemical properties or exerting an adverse effect on its utility. Thus the term "stabilizing amount", as used in the specification and claims herein, includes any such proportion. Illustratively, an amount of turpentine ranging from about 0.1 to about 12, and preferably about 0.3–8, parts is used per every 100 parts by weight of the halogenated polyol. In accordance with the more preferred embodiments of the invention, an amount of turpentine ranging from about 0.7 to about 5, and still more preferably about 1–3, parts is used per 100 parts by weight of the halogenated polyol.

In practicing the invention, a stabilizing proportion of turpentine is simply added to the halogenated polyol. For maximum effectiveness, the turpentine should be thoroughly mixed with the halogenated polyol using any suitable means such as a mechanical agitator.

By virtue of the incorporation of turpentine in halogenated polyols according to the invention, these polyols exhibit a marked improvement in stability when exposed to heat. They are therefore less susceptible to thermal degradation during processing and storage. Thus from an economic standpoint, considering the relatively very low cost and ready availability of turpentine, the invention provides a very simple and inexpensive solution to a heretofore relatively costly problem connected with the handling, storage, and use of halogenated polyols.

Polyols stabilized according to the invention are of utility, when reacted with an organic polyisocyanate in the presence of a catalyst and a foaming agent, in making flame retardant polyurethane foams. These foams in turn are of great utility in various applications such as home building insulation and furniture construction.

The following examples are provided to illustrate the invention. In all these examples, the halogenated polyol used was a polychlorinated polyether polyol prepared as follows: one mole of hydrous dextrose (e.g., d-glucose monohydrate) was mixed with one mole of ethylene glycol. This mixture was heated to about 95°C followed by the addition thereof of 3 grams of boron trifluoride etherate catalyst. Then, over a period of 4½ hours, during which the mixture was maintained at a temperature of about 90°C and under constant agitation, 940 grams of 4,4,4-trichloro-1,2-epoxybutane were added gradually. After an additional post reaction time of 30 minutes, the resulting product mixture was neutralized with a dilute aqueous solution of sodium hydroxide and thereafter stripped of water and low-boiling impurities. Thus obtained, the polychlorinated polyether polyol had a dark amber color, a hydroxyl number of 368, a water content of 0.15% by weight, a pH of 4.6, and a chlorine content of 46% by weight.

EXAMPLE 1

A 200-gram sample of the polychlorinated polyether polyol described above was placed in a transparent, stoppered, glass bottle. To this, 2 grams of turpentine were added and thoroughly mixed with the polyol. The stoppered bottle was then placed in an oven maintained at 50°C. At the end of 12 weeks, the bottle was removed from the oven and allowed to cool to room temperature. Then the hydroxyl number, water content and pH of the polyol were determined. The results are provided in Table 1 below.

For purposes of comparison a second 200-gram sample, identified as Comparison 1, was aged in the identical manner described above. This sample was used as is without the addition thereto of turpentine. The hydroxyl number, water content and pH of this aged sample were determined and the results are provided in Table 1.

Table 1

|  | Ex. 1 | Comparison 1 | Unaged Sample |
| --- | --- | --- | --- |
| Hydroxyl number | 362 | 344 | 368 |
| Water content | 0.16 | 0.42 | 0.15 |
| pH | 4.7 | 2.6 | 4.6 |

The data in Table 1 demonstrates the stabilizing effect which is achieved by the addition of turpentine according to the invention. Thus as compared with the original unaged polyol, the aged sample, identified as Example 1 and containing 1% of turpentine, exhibited little or practically no change in hydroxyl number, water content and pH as a result of aging; whereas, the sample identified as Comparison 1, which was similarly aged in the absence of turpentine, underwent a substantial decrease in hydroxyl number coupled with sizeable increases in acidity and water content.

EXAMPLES 2–3

These two examples are provided to illustrate the effect of turpentine in slowing down or reducing the thermal degradation of halogenated polyols when these are subjected to relatively high temperatures. Using the general procedure of Example 1, in Example 2 a 200-gram sample of the polychlorinated polyether polyol described above was placed in a 75°C oven for 30 hours after 2 grams of turpentine were mixed therewith. For comparison, another 200-gram sample, identified as Comparison 2, was aged in the same manner, this sample being used as is without the addition of turpentine thereto.

In Example 3, a 200-gram sample, containing 2 grams of turpentine, was oven aged at 100°C for 30 hours, along with another sample, identified as Comparison 3, which contained no turpentine.

The hydroxyl number and pH of each of the four aged samples were determined and the results are provided in Table 2 below.

Table 2

|  | Samples Aged 30 hrs. at 75°C | | Samples Aged 30 hrs. at 100°C | | Unaged Sample |
| --- | --- | --- | --- | --- | --- |
|  | Example 2 | Comparison 2 | Example 3 | Comparison 3 | |
| Hydroxyl Number | 356 | 353 | 326 | 257 | 368 |
| pH | 4.8 | 3.0 | 2.8 | 2.6 | 4.6 |

EXAMPLE 4

Following the general procedure of Example 1, a 200-gram sample of the polychlorinated polyether polyol containing 2 grams of turpentine was placed in an oven maintained at 60°C for 4 weeks. The color of the sample was examined visually at the end of the first, second, third and fourth weeks. The same procedure was followed in the case of another 200-gram sample, identified as Comparison 4, which contained no turpentine. The results of the visual color examination are reported in Table 3 below.

Table 3

| | Color Changes Due to Aging at 60°C | | | |
| --- | --- | --- | --- | --- |
|  | 1 week | 2 weeks | 3 weeks | 4 weeks |
| Example 4 | normal | normal | normal | normal |
| Comparison 4 | darker | black | black | black |

As indicated in Table 4, the polychlorinated polyol sample containing turpentine underwent no color degradation or change after being exposed to a 60°C for four weeks. By contrast, the sample containing no turpentine was discolored after 1 week at 60°C, and turned black at the end of the second week. Furthermore, when the pH of each of the two samples was measured at the end of the 4-week aging period, the sample identified as Example 4 had a pH of 4.92 while the sample identified as Comparison 4 had a pH of 2.86, a marked decrease from the original pH (unaged sample) of 4.6.

EXAMPLES 5–6

The general procedure of Example 4 was followed, except that an aging temperature of 110°C was used. Furthermore, while in Example 5 the polyol sample contained 2 grams (1%) of turpentine, the polyol sample in Example 6 contained 4 grams (2%) of turpentine. A comparison sample, identified as Comparison 5, which contained no turpentine, was also subjected to the same aging test. The results of the visual color examination are provided in Table 4 below.

Table 4

| | Color Changes Due to Aging at 110°C | | | |
| --- | --- | --- | --- | --- |
|  | 4 hrs. | 6 hrs. | 22 hrs. | 30 hrs. |
| Example 5 (1% turpentine) | normal | black | black | black |
| Example 6 (2% turpentine) | normal | normal | darker | black |
| Comparison 5 | black | black | black | black |

As shown in Table 4, the sample identified as Comparison 5, which contained no turpentine, exhibited no color stability when exposed to a temperature of 110°C for 4 hours or more. On the other hand, the sample identified as Comparison 5, which contained 1% of turpentine, remained color stable after 4 hours at 110°C. And the sample identified as Example 6, which contained 2% of turpentine, was color stable after 6 hours at 110°C, although it did finally undergo some color change after 22 hours at this temperature, becoming black after 30 hours. These findings demonstrate the increased stabilizing effect which obtains as a function of increasing the content of turpentine in the halogenated polyol.

What is claimed is:

1. A halogenated polyether polyol composition containing a stabilizing proportion of turpentine, said halogenated polyether polyol being comprised of the product of reacting
   a. a halogenated alkylene oxide having at least one halogen substituent, said halogen being chlorine, bromine or a mixture thereof, with
   b. a polyhydroxy compound having 2–8 hydroxyl groups or an alkylene oxide condensate thereof, said polyhydroxy compound being selected from the group consisting of ethylene glycol, propylene glycol, isobutylene glycol, 2,3-butanediol, 1,4-dihydroxy-2-butane, 1,4-dihydroxycyclohexane, 2-butyne-1,4-diol, 1,12-dihydroxyoctadecane, glycerin, trimethylolpropane, sorbitol, mannitol, inositol, erythritol, pentaerythritol, sucrose, dextrose, methyl glucoside, 1,4-dimethylolbenzene, glycerin monochlorohydrin, diglycerol, methyl ether of glycerin and a mixture thereof.

2. The composition of claim 1 wherein said halogenated alkylene oxide is 4,4,4-trichloro-1,2-epoxybutane.

3. The composition of claim 1 wherein said polyhydroxy compound is selected from the group consisting of (a) a mixture of dextrose and water, (b) an oxyalkylated mixture of dextrose and water, (c) a mixture of dextrose and an aliphatic polyhydric alcohol, and (d) an oxyalkylated mixture of dextrose and an aliphatic polyhydric alcohol, said aliphatic polyhydric alcohol being selected from the group consisting of ethylene glycol, propylene glycol, glycerol, trimethylolpropane and mixtures thereof.

4. The composition of claim 1 wherein said halogenated alkylene oxide contains 3–4 carbon atoms and a 1,2-epoxide ring.

5. The composition of claim 4 wherein said halogenated alkylene oxide contains at least two halogen substituents.

6. The composition of claim 5 wherein said halogen is chlorine.

7. The composition of claim 6 wherein said halogenated alkylene oxide is 4,4,4-trichloro-1,2-epoxybutane.

8. The composition of claim 7 wherein said polyhydroxy compound is selected from the group consisting of (a) a mixture of dextrose and water, (b) an oxyalkylated mixture of dextrose and water, (c) a mixture of dextrose and an aliphatic polyhydric alcohol, and (d) an oxyalkylated mixture of dextrose and an aliphatic polyhydric alcohol, said aliphatic polyhydric alcohol being selected from the group consisting of ethylene glycol, propylene glycol, glycerol, trimethylolpropane and mixtures thereof.

9. The composition of claim 8 wherein said halogenated polyether polyol has a hydroxyl number of about 200–700 and a chlorine content of about 20–80% by weight.

10. The composition of claim 9 wherein said halogenated polyol has a hydroxyl number of about 250–650 and a chlorine content of about 25–60% by weight.

11. The composition of claim 10 wherein said polyhydroxy compound is a mixture of dextrose and an aliphatic polyhydric alcohol.

12. The composition of claim 11 wherein said aliphatic polyhydric alcohol is ethylene glycol.

13. The composition of claim 12 wherein said polyhydroxy compound is a mixture of d-glucose monohydrate and ethylene glycol in a molar ratio of about 1:1.

14. The composition of claim 13 wherein said stabilizing proportion ranges from about 1 to about 3 parts per every 100 parts by weight of said halogenated polyether polyol.

* * * * *